United States Patent
Yadav et al.

(10) Patent No.: US 12,007,955 B2
(45) Date of Patent: Jun. 11, 2024

(54) SYSTEM AND METHOD FOR ANALYZING FILE SYSTEM DATA USING A VIRTUAL FILE SYSTEM GENERATED USING A METADATA BACKUP

(71) Applicant: Dell Products L.P., Round Rock, TX (US)

(72) Inventors: Sunil Yadav, Bangalore (IN); Shelesh Chopra, Bangalore (IN)

(73) Assignee: DELL PRODUCTS L.P., Round Rock, TX (US)

(*) Notice: Subject to any disclaimer, the term of this patent is extended or adjusted under 35 U.S.C. 154(b) by 0 days.

(21) Appl. No.: 17/952,520

(22) Filed: Sep. 26, 2022

(65) Prior Publication Data
US 2024/0104068 A1    Mar. 28, 2024

(51) Int. Cl.
*G06F 16/188* (2019.01)
*G06F 16/16* (2019.01)

(52) U.S. Cl.
CPC .......... *G06F 16/188* (2019.01); *G06F 16/164* (2019.01)

(58) Field of Classification Search
CPC .............................. G06F 16/188; G06F 16/164
See application file for complete search history.

(56) References Cited

U.S. PATENT DOCUMENTS

| | | | | |
|---|---|---|---|---|
| 2011/0066668 A1* | 3/2011 | Guarraci | ............... | G06F 16/188 707/831 |
| 2013/0238572 A1* | 9/2013 | Prahlad | ............... | H04L 67/1095 707/741 |
| 2015/0095972 A1* | 4/2015 | Sharma | ............... | H04W 12/08 726/1 |
| 2022/0138207 A1* | 5/2022 | Yelheri | ............... | G06F 16/289 707/722 |
| 2022/0342866 A1* | 10/2022 | Kotwal | ............... | G06F 16/188 |

* cited by examiner

*Primary Examiner* — Robert W Beausoliel, Jr.
*Assistant Examiner* — Mohammad S Bhuyan
(74) *Attorney, Agent, or Firm* — Chamberlain, Hrdlicka, White, Williams & Aughtry; Aly Z. Dossa

(57) ABSTRACT

A method for managing data includes obtaining, by a file system metadata manager, a data access request for a file system, wherein the data access request is obtained from an analytics engine, in response to the data access request: obtaining a metadata backup, wherein the metadata backup is associated with the file system, extracting file system metadata from the metadata backup, generating, using the file system metadata, a virtual file system associated with the file system, and providing the virtual file system to the analytics engine, wherein the analytics engine performs an analysis on the file system using the virtual file system.

14 Claims, 8 Drawing Sheets

SYSTEM AND METHOD FOR ANALYZING FILE SYSTEM DATA USING A VIRTUAL FILE SYSTEM GENERATED USING A METADATA BACKUP

BACKGROUND

Computing devices in a system may include any number of internal components such as processors, memory, and persistent storage. Data may be modified and/or otherwise managed locally in a client environment. The data may be transferred externally. The data may be analyzed by an analytics engine operating externally to the client device.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
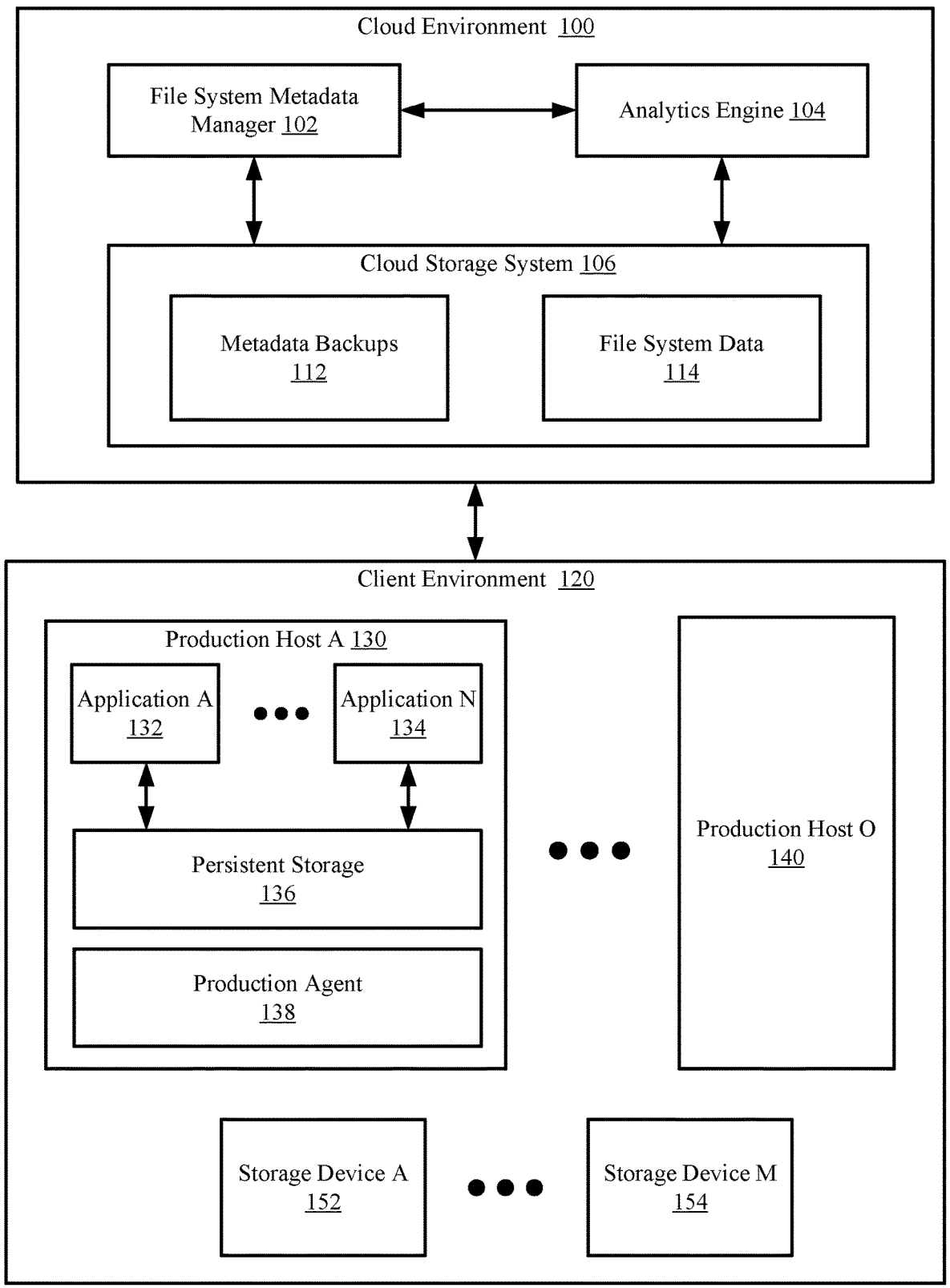
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing data. Specifically, embodiments relate to methods and system for managing and storing file system data in an environment external to the client environment in which the file system data is produced. For example, the file system data may be generated, modified, or otherwise managed by applications executing on a production host of the client environment. The file system data may be stored in a backup in the client environment. An analytics engine, which is external to the client environment, may request to process the file system data. Instead of transferring all file system data to the analytics engine, a metadata backup may be transferred, which may include attributes associated with the file system data. Embodiments disclosed herein may include enabling an analytics engine, which is external to the client environment, to process file system data without the data being transferred the external system.

In one or more embodiments of the invention, the analytics engine may utilize a file system metadata manager that includes functionality for obtaining metadata backups associated with the file system data and generating a virtual file system using the metadata backups. The analytics engine may utilize the virtual file system to perform analysis of the file system without the file system data. The generation of the virtual file system using the metadata backup may reduce or otherwise remove the need to obtain the file system data from the client environment.

In one or more embodiments of the invention, the analytics engine may include functionality for utilizing the metadata backup, without the generation of the virtual file system, to analyze the file system. For example, the analytics engine may include functionality for implementing a machine learning algorithm to read the metadata backup, obtain at least a portion of the attributes of the file system, and perform an analysis of the file system using the obtained attributes. In one or more embodiments of the invention, the portion of the attributes to be obtained by the analytics engine for analysis is determined based on the machine learning algorithm. The use of the machine learning algorithm on a metadata backup associated with a file system to analyze the file system may reduce or otherwise remove the need to obtain the file system data from the client environment.

In such embodiments in which at least a portion of the file system data is required for the analysis, embodiments of the invention may include enabling the analytics engine to determine the required portion of the file system data. After determining such portion of the file system, the analytics engine (or any other entity without departing from the invention) may send a data access request to the client environment that specifies the requested portion of the file system data. In one or more embodiments, a production agent of the client environment may service the data access request and obtain the requested data from a file system backup stored in the client environment. The production agent may parse the file system backup to identify the portion of the file system data to be obtained. The production host may copy the identified portion of the file system data and transfer the copied portion to the analytics engine.

Various embodiments of the invention are described below.

FIG. 1 shows an example system in accordance with one or more embodiments of the invention. The system includes a client environment (120) and a cloud environment (100). The client environment (120) includes any number of production hosts (130, 140) that may each include one or more applications (132, 134) and a production agent (138). The cloud environment (100) may include a file system metadata manager (102), an analytics engine (104), and a cloud storage system (106). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the client environment (120) includes any number of components that are operatively connected to each other via a localized network. For example, the localized network may be a local area network (LAN). As a second example, the localized network may be a private network that requires administrative verification to allow a component to access it. In this embodiment, the private network may be managed by, for example, a company. In one or embodiments of the invention, the client environment (120) and the cloud environment (100) communicate via a wide area network (WAN).

In one or more embodiments of the invention, a production host (130) may include applications (132, 134). The applications (114, 116) may be logical entities executed using computing resources (not shown) of the production host (110). Each of the applications (114, 116) may be performing similar or different processes. In one or more embodiments of the invention, the applications (132, 134) provide services to users, e.g., clients (not shown). For example, the applications (132, 134) may host components. The components may be, for example, instances of databases, email servers, and/or other components. The applications (132, 134) may host other types of components without departing from the invention. An application (132, 134) may be executed on one or more production hosts as instances of the application.

In one or more embodiments, the applications (132, 134) may utilize a file system to manage the storage of data. In one or more embodiments of the invention, a file system is an organizational data structure that tracks how data is stored and retrieved in a system. The file system may specify references to files and any data blocks associated with each file. Each data block may include a portion of application data for an application. In one or more embodiments, the file data, application data, and/or other data utilized by the applications (132, 134) are stored in the persistent storage (136). In one or more embodiments, the file data and/or application data may be referred to as file system data.

In one or more of embodiments of the invention, the applications (132, 134) are implemented as computer instructions, e.g., computer code, stored on a persistent storage that when executed by a processor(s) of a computing device cause the computing device to provide the functionality of the applications (132, 134) described throughout this application.

In one or more embodiments of the invention, the production agent (138) includes functionality for generating a file system backup and metadata backup associated with the file system data. In one or more embodiments, the file system backups are generated by copying at least the file system data and storing the copy in the storage devices (132, 134). In one or more embodiments, the metadata backups are generated by storing file system metadata associated with the file system and the file system data and storing the file system metadata in the storage devices. In one or more embodiments, the metadata backups may be stored as files that are separate from the file system backups.

In one or more embodiments, the production agent (138) further includes functionality for servicing requests issued by components of the cloud environment (100). For example, the file system metadata manager (102) may issue requests for metadata backups or file system backups. The production agent (132) may include functionality for servicing the requests. Specifically, the production agent (132) may include functionality for obtaining the requested backups from the storage devices (152, 154) and transmitting the file system backups and/or a portion of the file system backups to the cloud environment (100).

While illustrated as a part of the production host (130, 140), the production agent (136) may be a separate entity. For example, the production agent (136) is implemented as a computing device (see e.g., FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.).

Figure 6:
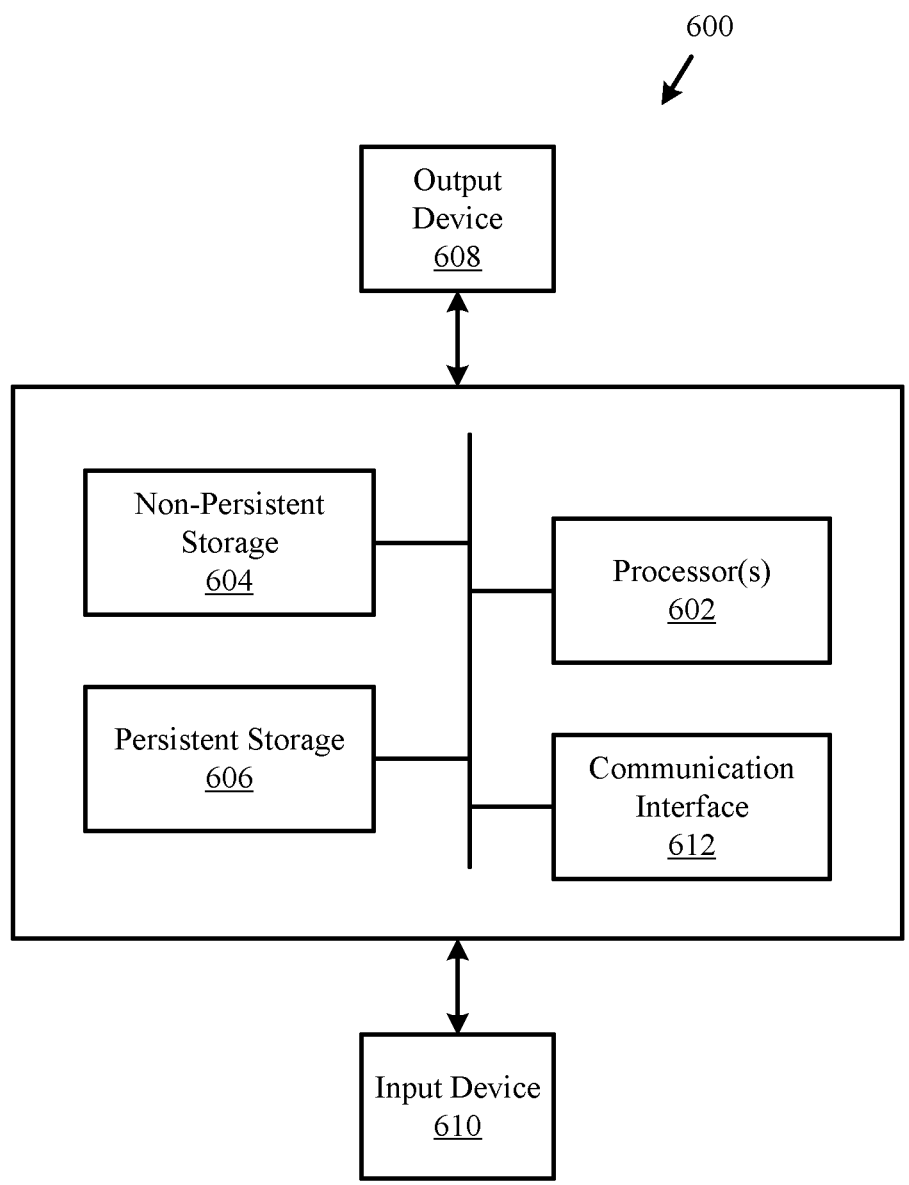
FIG. 6 shows a diagram of a computing device in accordance with one or more embodiments of the invention.

In one or more embodiments, each production host (130, 140) is implemented as a computing device (see e.g., FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (130, 140) described throughout this application.

In one or more embodiments of the invention, one or more of the production hosts (130, 140) are implemented as a logical device. The logical device may utilize the computing resources of any number of computing devices and thereby provide the functionality of the production hosts (130, 140) described throughout this application.

In one or more embodiments, the file system metadata manager (102) includes functionality for managing the metadata provided to the analytics engine (104). For example, the file system metadata manager (102) may include functionality for communicating with the client environment (120) to obtain at least a portion of metadata backups (112) or file system backups (114).

In one or more embodiments of the invention, the file system metadata manager (102) includes functionality for generating a virtual file system for use by the analytics engine (104). In one or more embodiments, the virtual file system is an data structure that provides access into the organization of a file system without the need to access the file system directly. The virtual file system may be stored in the cloud environment (100). By providing the virtual file system to the analytics engine (104), the analytics engine (104) may perform any analysis on the file system managed in the client environment (120) without the need to access the file system directly in the client environment (120). The file system metadata manager (120) may generate the virtual file system in accordance with, e.g., FIG. 2.

In one or more embodiments, the file system metadata manager (102) is implemented as a computing device (see e.g., FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the file system metadata manager (102) described throughout this application.

In one or more embodiments of the invention, the file system metadata manager (102) is implemented as a logical device. The logical device may utilize the computing resources of any number of computing devices and thereby provide the functionality of the file system metadata manager (102) described throughout this application.

In one or more embodiments of the invention, the analytics engine (104) includes functionality for performing processing (e.g., analysis) on at least a portion of a file system. The analytics engine (104) may obtain processing requests from an entity of the client environment (120). The processing request may specify performing an analysis on the file system. The analytics engine (104) may be serviced in accordance with, e.g., FIG. 3. Alternatively, the analytics engine (104) may perform the processing specified in the processing request using the virtual file system generated by the file system metadata manager (102).

In one or more embodiments, the analytics engine may utilize one or more metadata backups (112) stored in a cloud storage system (106) of the cloud environment (100) to perform the processing of the file system. The metadata backups (112) may be copies of metadata backups generated in the client environment (120). As discussed above, the analytics engine (104) determines that the file system metadata included in the metadata backups (112) may not suffice for the purpose of the processing of the file system. Based on this determination, the analytics engine (104) may request to obtain at least a portion of the file system data (e.g., data associated with one or more files). In such embodiments in which the analytics engine determines that it requires at least a portion of file system data, a copy of a portion of file system data (114) may be obtained and stored in the cloud storage system (106).

In one or more embodiments, the analytics engine (104) is implemented as a computing device (see e.g., FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the analytics engine (104) described throughout this application.

In one or more embodiments of the invention, the analytics engine (104) is implemented as a logical device. The logical device may utilize the computing resources of any number of computing devices and thereby provide the functionality of the analytics engine (104) described throughout this application.

While illustrated as part of the cloud storage system (106), the metadata backups (112) and file system data (114) may be stored in the storage devices (152, 154) of the client environment.

Figure 2:
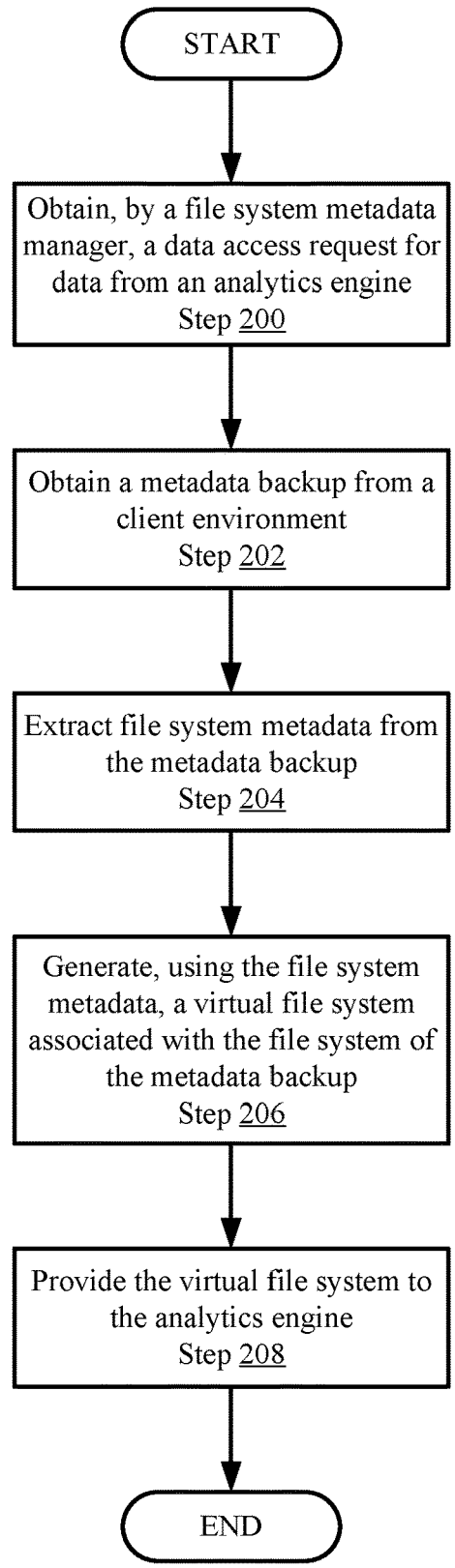
FIG. 2 shows a flowchart for analyzing data using a virtual file system in accordance with one or more embodiments of the invention.
Figure 3:
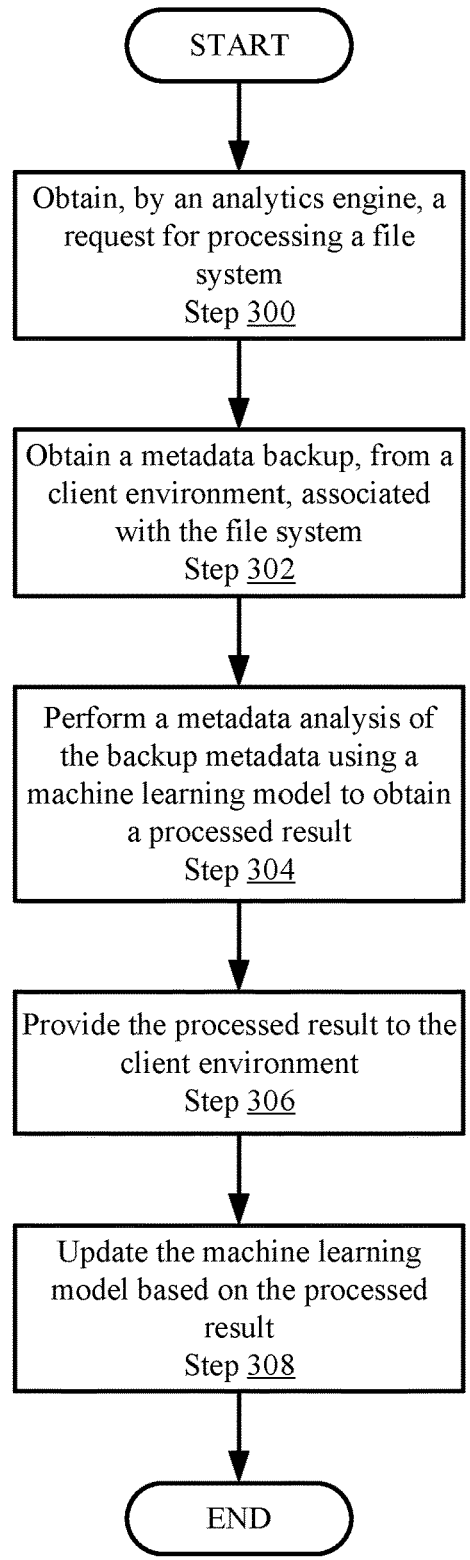
FIG. 3 shows a flowchart for analyzing data using a metadata backup in accordance with one or more embodiments of the invention.
Figure 4:
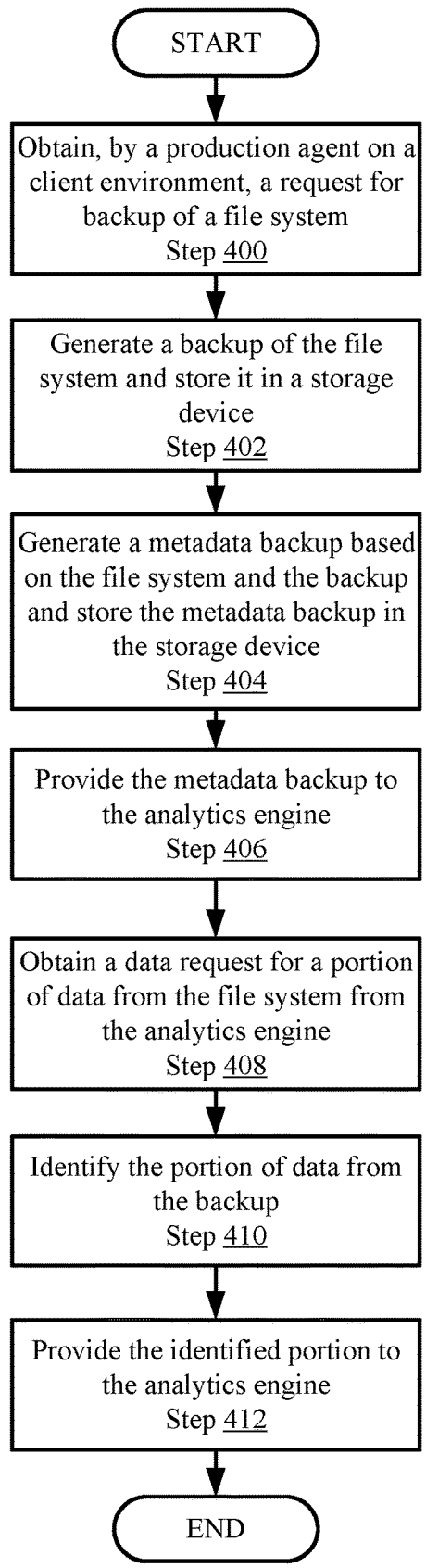
FIG. 4 shows a flowchart for processing data access requests in accordance with one or more embodiments of the invention.

FIGS. 2-4 show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2-4 may be performed in parallel with any other steps shown in FIGS. 2-4 without departing from the scope of the invention.

FIG. 2 shows a flowchart for analyzing data using a virtual file system in accordance with one or more embodiments of the invention. The method shown in FIG. 2 may be performed by, for example, a file system metadata manager (102, FIG. 1). Other components of the system illustrated in FIG. 1 may perform the method of FIG. 2 without departing from the invention.

Turning to FIG. 2, in step 200, a data access request is obtained for data from an analytics engine. In one or more embodiments, the data access request specifies obtaining access to a file system managed by a client environment (e.g., by one or more applications executing in the client environment). The data access request may specify providing a virtual file system to the analytics engine.

In step 202, a metadata backup is obtained from a client environment. In one or more embodiments of the invention, the metadata backup is obtained in response to the data access request. Alternatively, the metadata backup is obtained prior to or not related to the data access request. The metadata backup is obtained by sending a metadata backup request to a production agent of the client environment. The production agent may transmit a copy of the requested metadata backup to the cloud environment. The metadata backup may be stored in a cloud storage system accessible to the file system metadata manager.

In step 204, file system metadata is extracted from the metadata backup. As discussed above, the file system metadata includes any information regarding to the organizational structure of the file system and/or the files in the file system. The information may include, for example, a number of files, a set of parent files associated with each file, a file size of each file, a file type of each file, a timestamp for most recent modification to the file, a timestamp for the most recent point in time each file was accessed, and a file path of each file. Other information may be included in the file system metadata without departing from the invention.

In one or more embodiments, the file system metadata does not include the file system data. In other words, the data included in each file may not be included in the file system metadata. By not including the file system metadata, the network usage between the client environment and the cloud environment is reduced.

In step 206, a virtual file system is generated using the file system metadata. In one or more embodiments, the virtual file system includes organizing the file system metadata such that the analytics engine may read the file system using the generated virtual file system. For example, the virtual file system may include pointers to each file based on the file path and/or the parent files of each file.

In step 208, the virtual file system is provided to the analytics engine. In one or more embodiments, the virtual file system is provided by notifying the analytics engine that the virtual file system is available for the analytics engine to perform analytics. In this manner, the analytics engine may perform any analysis that would have been performed on the file system without disrupting the file system being managed in the client environment.

FIG. 3 shows a flowchart for analyzing data using a metadata backup in accordance with one or more embodiments of the invention. The method shown in FIG. 3 may be performed by, for example, an analytics engine (104, FIG. 1). Other components of the system illustrated in FIG. 1 may perform the method of FIG. 3 without departing from the invention.

In step 300, a request for processing a file system is obtained. In one or more embodiments, the request specifies performing an analysis on the file system. Examples of analysis may include counting a number of files in the file system, calculating a file generation rate over a given period of time, classifying the files in the file system based on the file type and rate in which the files are modified, and a classification based on file paths. Other types of analysis may be performed without departing from the invention. The request may be issued by an application in the client environment. Alternatively, the request may be issued by a separate entity requesting analysis of the file system managed by the client system.

In step 302, a metadata backup associated with the file system is obtained from the client environment. In one or more embodiments of the invention, the metadata backup is obtained in response to the request. Alternatively, the metadata backup is obtained prior to or not related to the request. The metadata backup is obtained by sending a metadata backup request to a production agent of the client environment. The production agent may transmit a copy of the requested metadata backup to the cloud environment. The metadata backup may be stored in a cloud storage system accessible to the analytics engine.

In step 304, a metadata analysis is performed on the metadata backup using a machine learning model to obtain a processed result. In one or more embodiments of the invention, the metadata analysis includes extracting at least a portion of the file system metadata to analyze the file system using the at least portion of the file system data. For example, the metadata backup may specify, for example, a number of files, a set of parent files associated with each file, a file size of each file, a file type of each file, a timestamp for most recent modification to the file, a timestamp for the most recent point in time each file was accessed, and a file path of each file. Other information may be included in the file system metadata without departing from the invention. The analytics engine may input an identifier of the analysis to a machine learning model and obtain, as an output, a portion of the metadata backup to be obtained for the analysis to be performed.

In one or more embodiments, the machine learning model is generated by training historical data that specifies previous instances of analysis performed by the analytics engine and the attributes of the file system metadata used to perform the analysis. The machine learning model may be trained to identify the attributes (or a portion thereof) that would likely be required by the analytics engine to perform a given analysis. The resulting machine learning model may be utilized by inputting a given analysis (e.g., a counting calculation, an average timestamp calculation, etc.) and output the required attributes. The analytics engine may continue the metadata analysis by extracting the output portion of the file system metadata (e.g., the required attributes) and implementing the analysis using the extracted file system metadata. The result of the analysis may include a processed result.

In step 306, the processed result is provided to the client environment. In one or more embodiments, the processed result is provided by sending the processed result to the entity that sent the request in step 300.

In step 308, the machine learning model is updated based on the processed result. In one or more embodiments, the machine learning model is updated by retraining the machine learning model with the results of processed result and the metadata analysis. For example, based on the type of data required by the analytics engine and the type of metadata used by the analytics engine for the analytics, the machine learning model may be updated to specify any additional data (e.g., file system data, file system metadata, etc.) required by the analytics engine to perform the given analysis. In this manner, the machine learning model improves the determination of the type of file system metadata to output for the analytics engine.

FIG. 4 shows a flowchart for processing data access requests in accordance with one or more embodiments of the invention. The method shown in FIG. 4 may be performed by, for example, a production agent (138, FIG. 1). Other components of the system illustrated in FIG. 1 may perform the method of FIG. 4 without departing from the invention.

In step 400, a request for backup of a file system is obtained. In one or more embodiments, the request for the backup may be in response to a backup policy implemented by the production agent for generating a backup.

In step 402, a backup of the file system is generated and stored in a storage device of the client device. In one or more embodiments of the invention, the backup is generated by storing a copy of the file system data on a backup file and storing the backup file in a storage device in the client environment.

In step 404, a metadata backup is generated based on the file system backup. In one or more embodiments, the metadata backup is generated by generating the file system metadata associated with the file system data and the file system, and storing the file system metadata in a metadata file and storing the metadata file in a storage device. The metadata backup and the file system backup may be stored in the same or different storage devices without departing from the invention.

In step 406, the metadata backup is provided to the cloud environment. In one or more embodiments, the metadata backup is provided in response to a request (e.g., a data access request in FIG. 2) from an entity in the cloud environment. A copy of the metadata backup may be transmitted to the cloud environment and stored in the cloud storage system.

In step 408, a data request for a portion of data is obtained from the analytics engine. In one or more embodiments, the data request specifies providing a portion of file system data to the analytics engine. The portion of data may be specified in the data request.

In step 410, the portion of data is identified from the file system backup. In one or more embodiments, the portion is identified based on the portion of file system data specified in the data request. In one or more embodiments of the invention, the portion of data is identified by the analytics engine by performing the processing (e.g., discussed in FIG. 3), determining that the processing could not be completed without at least a portion of file system data, and determining the file system data that is required to complete the processing.

In step 412, the identified portion is provided to the analytics engine. In one or more embodiments of the invention, the identified portion is provided by copying the identified portion from the file system backup and sending the copy to the analytics engine.

Example 1

Figure 5A:
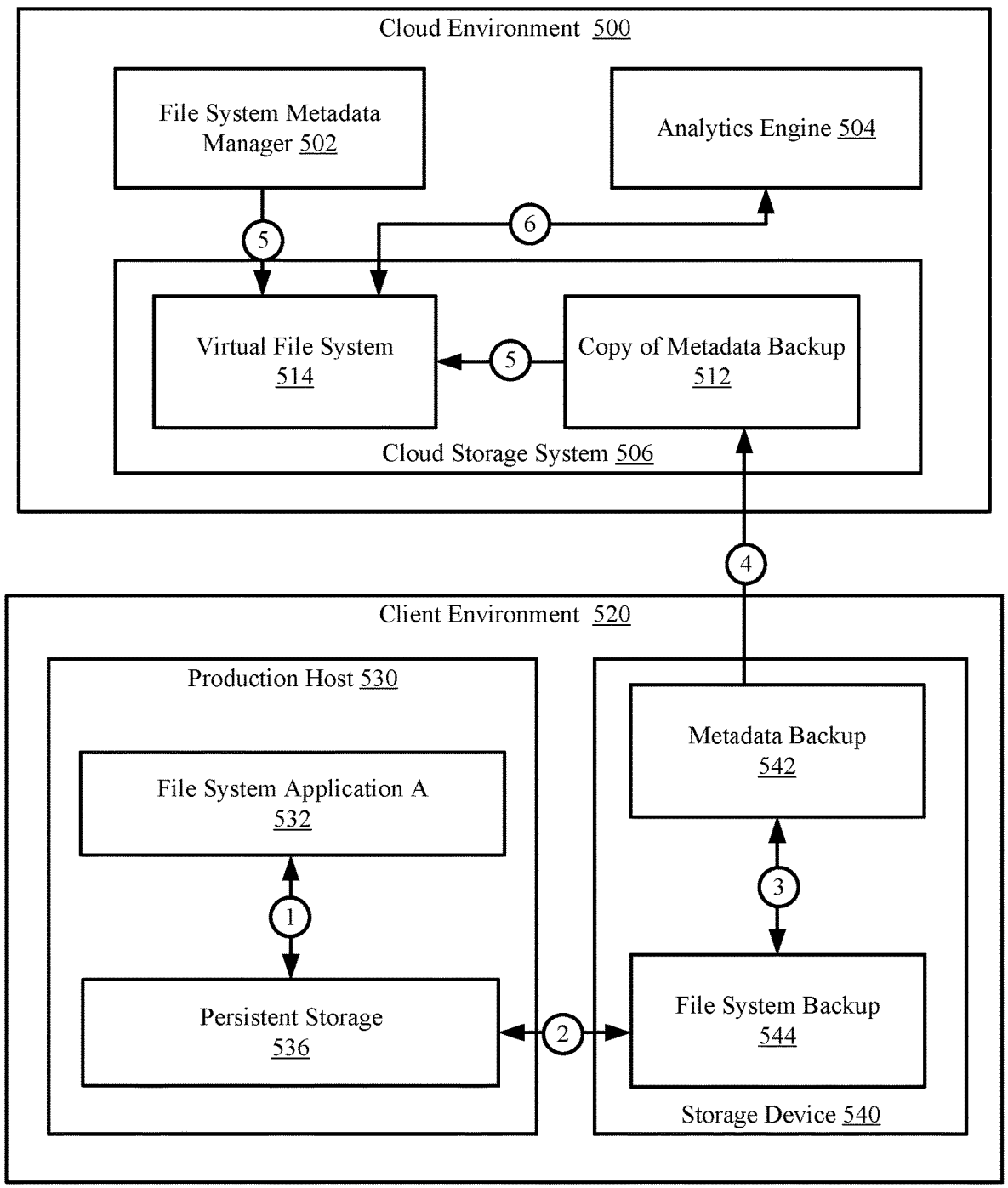
FIGS. 5A-5C show an example in accordance with one or more embodiments of the invention.

The following section describes an example. The example, illustrated in FIG. 5A, is not intended to limit the invention and is independent from any other examples discussed in this application. Each step performed by a component of FIG. 5A may be illustrated with a numbered circle and described below with a bracketed number (e.g., "[1]"). Turning to the example, consider a scenario in which an analytics engine is commissioned to perform an analysis of a file system managed by a client environment.

Turning to the example, FIG. 5A shows a diagram of an example system. For the sake of brevity, not all components of the example system may be illustrated in FIG. 5A. The example system may include a client environment (520) that includes a production host (530) and a storage device (540). The production host (530) may include a file system application (532) that produces data corresponding to the file system. The file system data may be stored in persistent storage (536) of the production host [1].

At a later point in time, a backup of the file system data is generated and stored in the storage device (540) [2]. Based on the file system backup (544), a metadata backup (542) is also generated and stored in the storage device (540) [3]. The file system backup (544) stores a copy of the file system data, which includes the data for each file in the file system. A copy of the metadata backup (542) may be transmitted to the cloud environment (500) based on a policy, implemented by the production agent (not illustrated in FIG. 5A), that indicates copying the metadata backup (512) to the cloud environment (500). The copy of the metadata backup (512) is stored in the cloud storage system (506) of the cloud environment (500) [4].

At a later point in time, an analytics engine (504), operating in the cloud environment (500), attempts to perform an analysis of the file system associated with the copy of the metadata backup (512). Based on this, the file system metadata manager (502), performs the method of FIG. 2 to generate a virtual file system (514) using the copy of metadata backup (512) [5]. The virtual file system is an abstraction of the file system managed in the client environment (520). The virtual file system (514) may include the organization of the file system. The analytics engine (504) may perform the analysis using the generated virtual file system (514) [6].

End of Example 1

Example 2

Figure 5B:
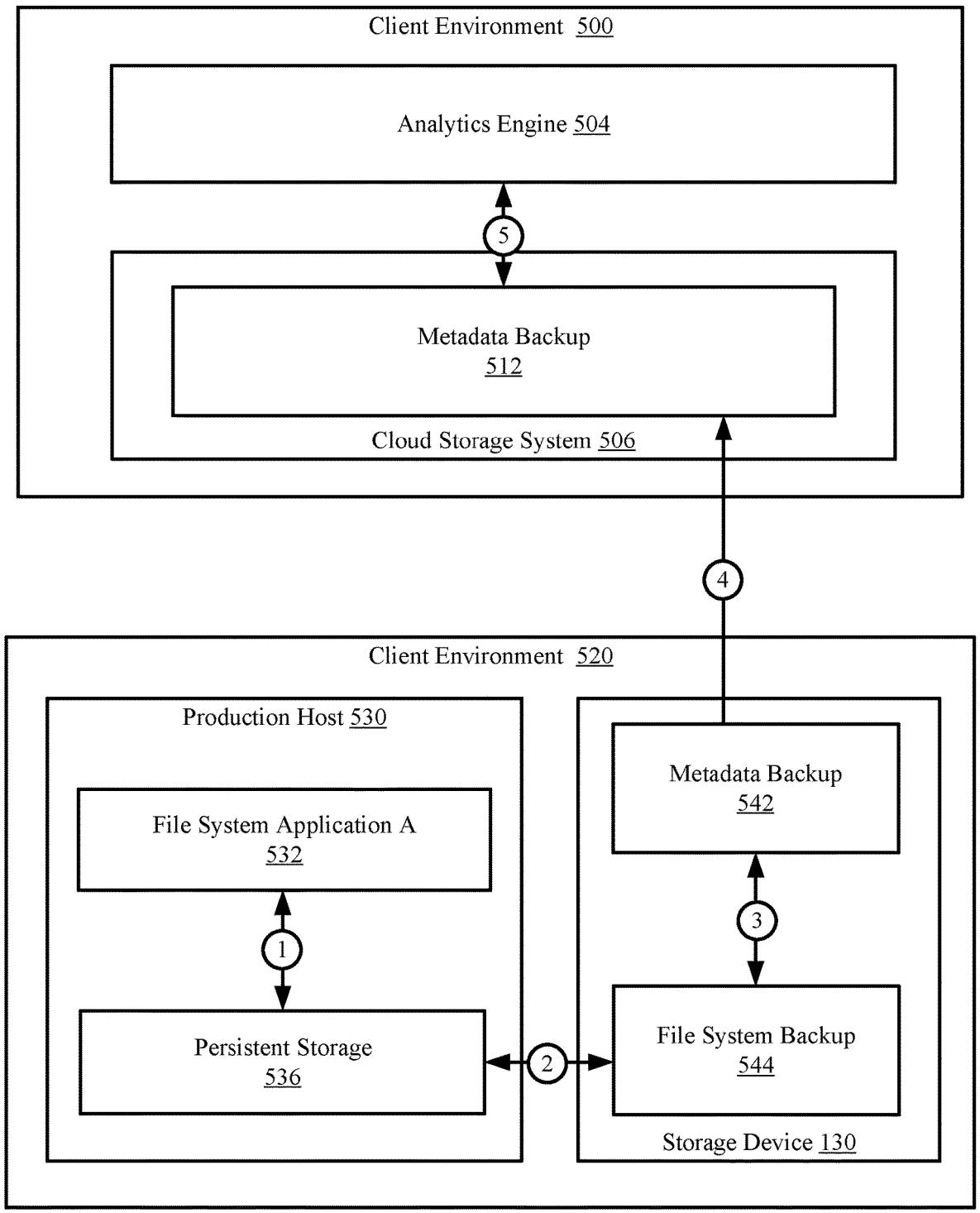

The following section describes an example. The example, illustrated in FIG. 5B, is not intended to limit the invention and is independent from any other examples discussed in this application. Each step performed by a component of FIG. 5B may be illustrated with a numbered circle and described below with a bracketed number (e.g., "[1]"). Turning to the example, consider a scenario in which an analytics engine is commissioned to perform an analysis of a file system managed by a client environment.

Turning to the example, FIG. 5B shows a diagram of an example system. For the sake of brevity, not all components of the example system may be illustrated in FIG. 5B. Similar to Example 1, the example system may include a client environment (520) that includes a production host (530) and a storage device (540). The production host (530) may include a file system application (532) that produces data corresponding to the file system. The file system data may be stored in persistent storage (536) of the production host [1].

At a later point in time, and similar to Example 1, a backup of the file system data is generated and stored in the storage device (540) [2]. Based on the file system backup (544), a metadata backup (542) is also generated and stored in the storage device (540) [3]. The file system backup (544) stores a copy of the file system data, which includes the data for each file in the file system. A copy of the metadata backup (542) may be transmitted to the cloud environment (500) based on a policy, implemented by the production agent (not illustrated in FIG. 5A), that indicates copying the metadata backup (512) to the cloud environment (500). The copy of the metadata backup (512) is stored in the cloud storage system (506) of the cloud environment (500) [4].

At a later point in time, an analytics engine (504), operating in the cloud environment (500), attempts to perform an analysis of the file system associated with the copy of the metadata backup (512). In contrast to Example 1, the analytics engine (504) performs the method of FIG. 3 to perform the analysis using the copy of metadata backup (512) [5]. Specifically, the analytics engine applies the given analysis (e.g., a calculation of the average lifespan of the files in the file system) to a machine learning model (not shown) that determines the file attributes to be extracted from the copy of the metadata backup (512). In this example, the machine learning model determines that the file attributes to be used are the timestamp of the point in time each file was created and the number of files in the file system. Based on this output, the analytics engine (504) extracts the determined file attributes from the copy of the metadata backup (512). The extracted file attributes may be used to perform the analysis and generate a processed result. The processed result is provided to the client environment (520).

End of Example 2

Example 3

Figure 5C:
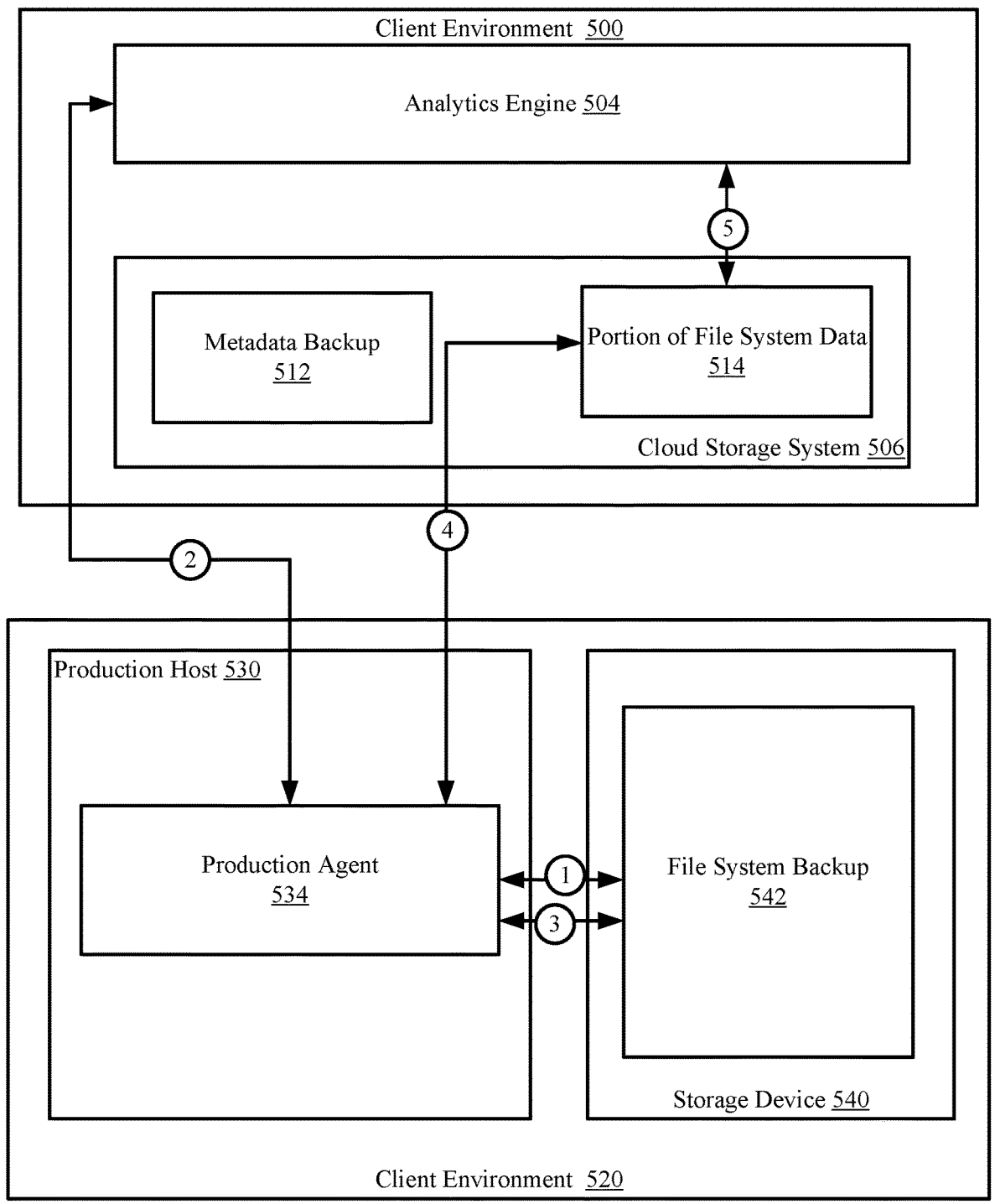

The following section describes an example. The example, illustrated in FIG. 5C, is not intended to limit the invention and is independent from any other examples discussed in this application. The example discussed below may be a continuation of Example 2 discussed above. Each step performed by a component of FIG. 5B may be illustrated with a numbered circle and described below with a bracketed number (e.g., "[1]"). Turning to the example, consider a scenario in which an analytics engine is commissioned to perform an analysis of a file system managed by a client environment. After performing an analysis of file system metadata in accordance with FIG. 5C, the analytics engine may determine that a portion of file system data is required to complete the analysis.

Turning to the example, FIG. 5B shows a diagram of an example system. For the sake of brevity, not all components of the example system may be illustrated in FIG. 5B. Similar to Example 1, the example system may include a client environment (520) that includes a production host (530) and a storage device (540). The production host (530) may include a file system application (not shown in FIG. 5C) that produces data corresponding to the file system. A production agent (534) generates a file system backup (542) [1].

At a later point in time, the analytics engine, after performing the analysis discussed in Example 2, the analytics engine (504) may send a data request, in accordance with FIG. 4, that specifies obtaining a portion of data that it may use to complete the analysis [2]. In response to the data request, the production agent (534) services the data request in accordance with FIG. 4. Specifically, the production agent identifies the portion of file system data from the file system backup (542) [3]. The production agent then copies the identified portion and transmits the copy of the identified portion of file system data and transmits the copy to the cloud storage system (506) [4]. The analytics engine (504)

completes the analysis using the copy of the portion of the file system (514) now stored in the cloud storage system (506) [5].

End of Example 3

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may be implemented using instructions executed by one or more processors of the cloud environment. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
  obtaining, by a file system metadata manager, a data access request for a file system managed by a client environment (CE), wherein the data access request is obtained from an analytics engine operating on a cloud environment that is external to the CE, wherein the data access request specifies providing a virtual file system (VFS) to the analytics engine;
  in response to the data access request:
    obtaining a metadata backup, wherein the metadata backup is associated with the file system;
    extracting file system metadata from the metadata backup;
    in order to remove a need to access the file system directly from the CE, generating, using the file system metadata, the VFS associated with the file system, wherein the VFS is stored in the cloud environment, wherein the VFS comprises at least a pointer to a file of the file system based on a file path of the file; and
    providing the VFS to the analytics engine,
      wherein the analytics engine performs an analysis on the file system using the VFS.

2. The method of claim 1, wherein the metadata backup is obtained from the CE.

3. The method of claim 2, wherein the file system is generated by an application executing on the CE.

4. The method of claim 3, wherein the file system comprises an organization of file system data, wherein the file system data is generated by an application executing on the CE.

5. The method of claim 1, wherein the file system metadata comprises at least one of: a name of each file in the file system, a type of file for each file in the file system, a size of each file in the file system, an attribute of each file in the file system, and a category of each file in the file system.

6. A non-transitory computer readable medium comprising computer readable program code, which when executed by a computer processor enables the computer processor to perform a method for managing data, the method comprising:
  obtaining, by a file system metadata manager, a data access request for a file system managed by a client environment (CE), wherein the data access request is obtained from an analytics engine operating on a cloud environment that is external to the CE, wherein the data access request specifies providing a virtual file system (VFS) to the analytics engine;
  in response to the data access request:
    obtaining a metadata backup, wherein the metadata backup is associated with the file system;
    extracting file system metadata from the metadata backup;
    in order to remove a need to access the file system directly from the CE, generating, using the file system metadata, the VFS associated with the file system, wherein the VFS is stored in the cloud environment, wherein the VFS comprises at least a pointer to a file of the file system based on a file path of the file; and
    providing the VFS to the analytics engine,
      wherein the analytics engine performs an analysis on the file system using the VFS.

7. The non-transitory computer readable medium of claim 6, wherein the metadata backup is obtained from the CE.

8. The non-transitory computer readable medium of claim 7, wherein the file system is generated by an application executing on the CE.

9. The non-transitory computer readable medium of claim 8, wherein the file system comprises an organization of file system data, wherein the file system data is generated by an application executing on the CE.

10. The non-transitory computer readable medium of claim 6, wherein the file system metadata comprises at least one of: a name of each file in the file system, a type of file for each file in the file system, a size of each file in the file system, an attribute of each file in the file system, and a category of each file in the file system.

11. A system comprising:
a processor,
a file system metadata manager operating on the processor;
an analytics engine,
wherein the file system metadata manager is programmed to:
obtain a data access request for a file system managed by a client environment (CE), wherein the data access request is obtained from the analytics engine operating on a cloud environment that is external to the CE, wherein the data access request specifies providing a virtual file system (VFS) to the analytics engine;
in response to the data access request:
obtain a metadata backup, wherein the metadata backup is associated with the file system;
extract file system metadata from the metadata backup;
in order to remove a need to access the file system directly from the CE, generate, using the file system metadata, the VFS associated with the file system, wherein the VFS is stored in the cloud environment, wherein the VFS comprises at least a pointer to a file of the file system based on a file path of the file; and
provide the VFS to the analytics engine, wherein the analytics engine is programmed to:
obtain access to the VFS;
perform an analysis on the file system using the VFS to generate a processed result; and
provide the processed result to an application.

12. The system of claim 11, wherein the metadata backup is obtained from the CE.

13. The system of claim 11, wherein the file system comprises an organization of file system data, wherein the file system data is generated by the application.

14. The system of claim 11, wherein the file system metadata comprises at least one of: a name of each file in the file system, a type of file for each file in the file system, a size of each file in the file system, an attribute of each file in the file system, and a category of each file in the file system.

* * * * *